US 6,430,790 B1

(12) United States Patent
Haycook

(10) Patent No.: US 6,430,790 B1
(45) Date of Patent: Aug. 13, 2002

(54) BOILER TUBE FLARED-END SEGMENT PEELER TOOL

(75) Inventor: Thomas E. Haycook, Whitehall, OH (US)

(73) Assignee: Advanced Cutting Technologies, Ltd., Westerville, OH (US)

( * ) Notice: Subject to any disclaimer, the term of this patent is extended or adjusted under 35 U.S.C. 154(b) by 0 days.

(21) Appl. No.: 09/558,609

(22) Filed: Apr. 26, 2000

(51) Int. Cl.[7] ................................................ B23P 15/26
(52) U.S. Cl. ........................... 29/33 T; 29/727; 29/280; 29/282
(58) Field of Search ................... 29/33 T, 727, 29/726, 890.031, 33 R, 723, 426.4, 402.08, 426.5, 280, 282; 83/54, 178, 184

(56) References Cited

U.S. PATENT DOCUMENTS

| | | | |
|---|---|---|---|
| 1,598,458 A | * | 8/1926 | Sullivan |
| 2,176,626 A | * | 10/1939 | Gentry |
| 2,502,711 A | * | 4/1950 | Evans |
| 2,688,795 A | * | 9/1954 | Schwenzfeier |
| 2,834,106 A | * | 5/1958 | Conder |
| 2,983,042 A | * | 5/1961 | Frantz et al. |
| 3,628,246 A | * | 12/1971 | Bronne et al. |
| 3,729,806 A | * | 5/1973 | Bronne et al. |
| 6,182,354 B1 | * | 2/2001 | Weeks |
| 6,205,632 B1 | * | 3/2001 | Weeks et al. |
| 6,209,181 B1 | * | 4/2001 | Weeks |

* cited by examiner

Primary Examiner—David P. Bryant
Assistant Examiner—T. Nguyen
(74) Attorney, Agent, or Firm—Thomas S. Baker, Jr.

(57) ABSTRACT

A boiler tube peeler tool useful in connection with the removal of boiler tube flared-end segments from retention within a power boiler drum wall is provided with a tool guide element that slidably co-operates with boiler tube flared-end segment, and with a tool peeler element that slidably co-operates with the guide element and that peels unwanted gap metal from the boiler tube flared-end segment by shearing and bending when manually forced throughout the length of the retained boiler tube flared-end segment.

3 Claims, 3 Drawing Sheets

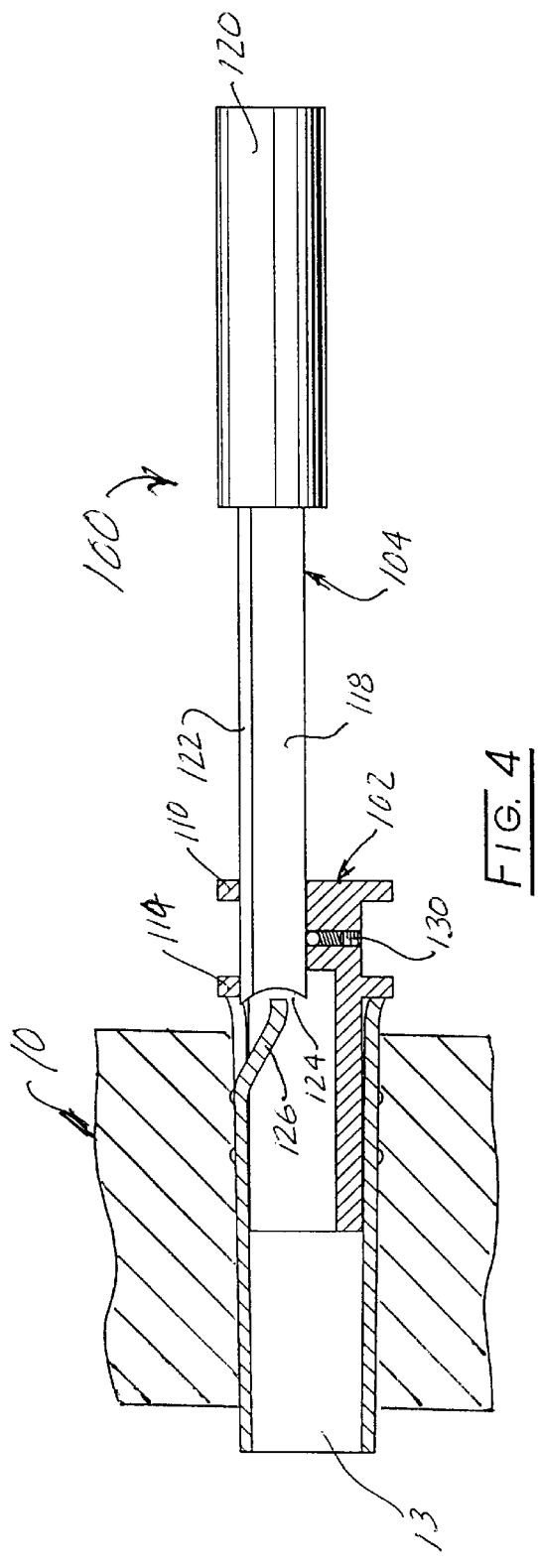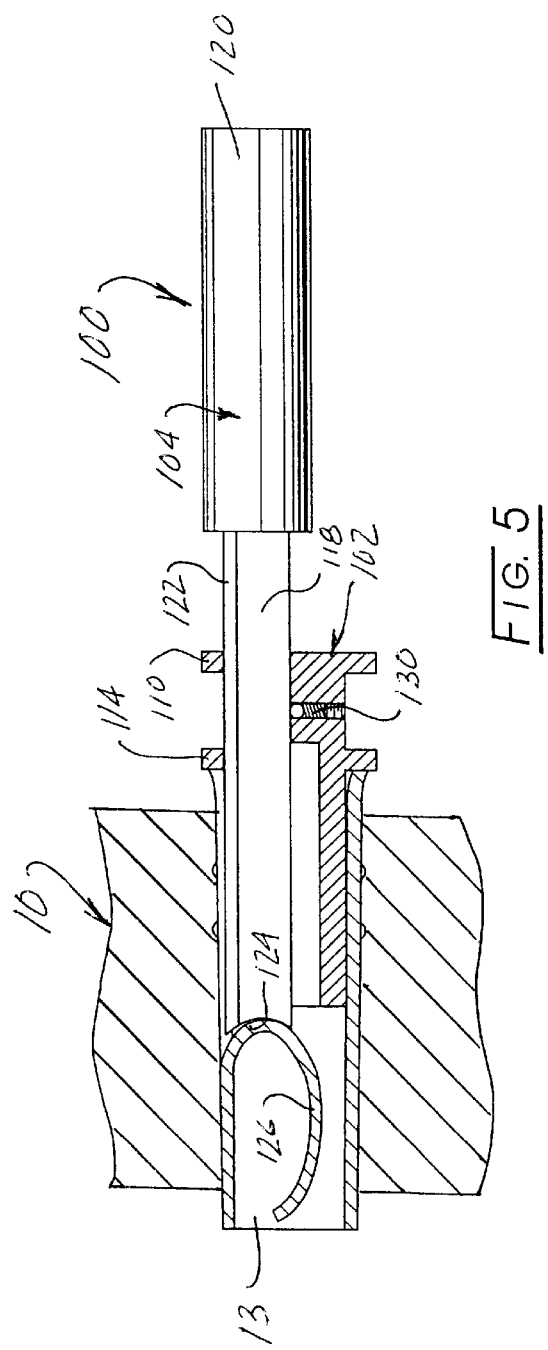

BOILER TUBE FLARED-END SEGMENT PEELER TOOL

CROSS-REFERENCES

None.

FIELD OF THE INVENTION

This invention pertains generally to power boilers, and specifically concerns apparatus that is particularly useful in connection with the maintenance removal of selected boiler tubes from being installed in a boiler drum wall as for subsequent replacement.

BACKGROUND OF THE INVENTION

The removal of water-tubes and fire-tubes from within power boilers for subsequent replacement using a tube-end gap-cutting tool of the type disclosed and claimed in U.S. Letters Patent No. 5,893,209 granted to Weeks et al. results in an intermediate-stage boiler tube flared-end segment that although having a pair of longitudinal grooves such grooves do not extend completely through the tube end wall material and the longitudinally-machined tube segment remains retained in the co-operating boiler drum wall. Such occurs because of a requirement to not cut into or otherwise damage drum wall metal. I have discovered that removal of the retained and grooved boiler tube flared-end segment may be accomplished manually by use of a hammer-driven novel hand-held tool that functions, by a shearing and bending action to "peel" tube-end wall metal positioned between the spaced-apart machined longitudinal grooves in the tube end segment completely away from the boiler drum wall and without causing wall damage.

Other objects and advantages of the present invention will become apparent from a consideration of the descriptions, drawings, and claims which follow.

SUMMARY OF THE INVENTION

The present invention is basically comprised of a guide element and a manually-driven peeler element that removably co-operates with the invention guide element.

The invention guide element has a longitudinally-slotted barrel section that slidably co-operates with the interior surface of a longitudinally-grooved boiler tube end segment from which gap metal is to be peeled by shearing and bending, has an integral end section with a peeler entrance opening, and has an intermediate stop provided with a tool insertion registration opening. The invention peeler element has an elongated peeler section that slidably co-operates with the guide element peeler entrance opening, the guide element stop insertion registration opening, and the guide element longitudinal slot, that has a curved shear-and-bend end face, and a drive-head section joined to the peeler section away from the peeler section shear-and-bend end face.

BRIEF DESCRIPTION OF THE DRAWINGS

FIG. 4 is a section view of the FIG. 3 hand-held boiler tube flared-end peeler tool taken at line 4—4 of FIG. 2 at the beginning of a boiler tube flared-end gap metal peel step; and FIG. 5 is an elevation section view of the invention tool co-operating with a gapped boiler tube flared-end segment taken at line 4—4 of FIG. 2 and at the end of a boiler tube flared-end gap metal peel step.

DETAILED DESCRIPTION

Figure 1:
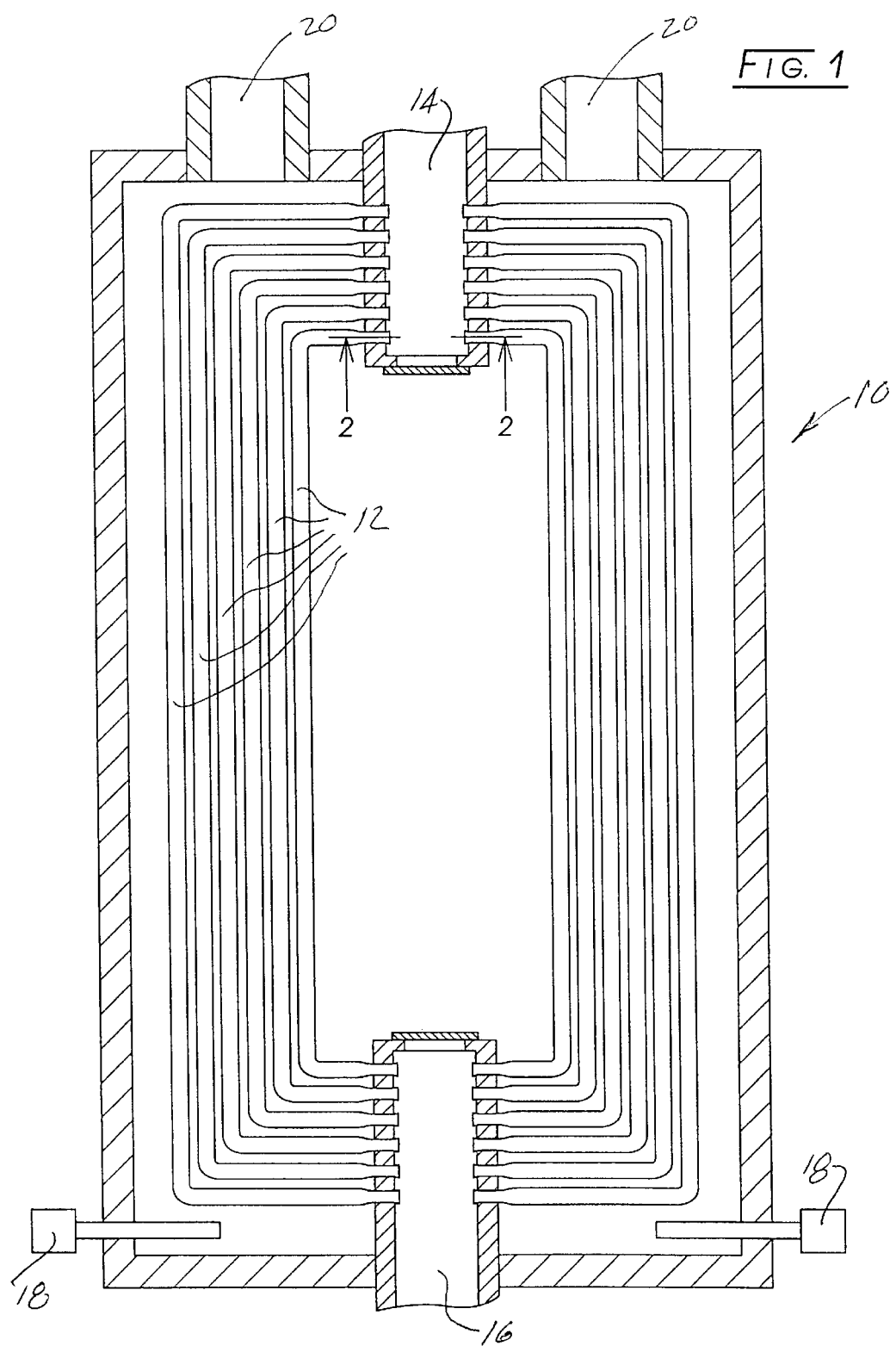
FIG. 1 is a schematic vertical section of a water-tube power boiler illustrating a typical environment in which the tool of the present invention is typically utilized.
Figure 2:
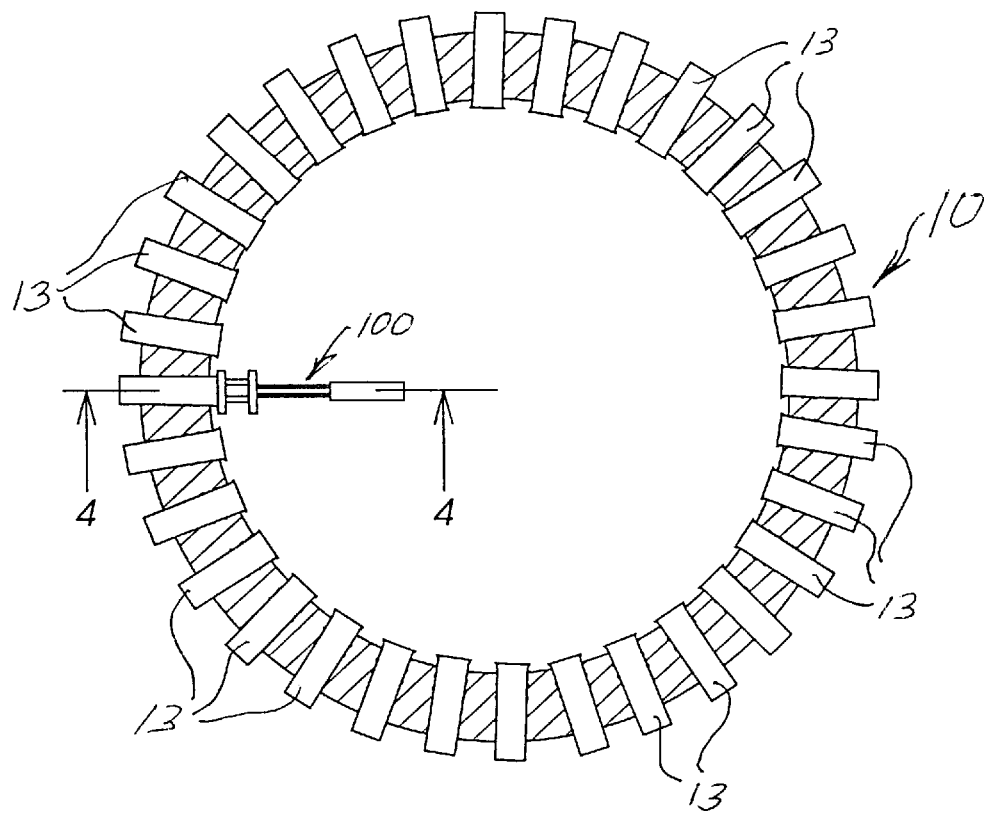
FIG. 2 is a section view taken at line 2—2 of FIG. 1 and illustrating the operating position of the hand-held tool of the present invention in the FIG. 1 boiler environment.

FIG. 1 schematically illustrates a power boiler 10 having multiple conventional boiler water-tubes 12 installed with their upper and lower flared ends co-operating with the walls of boiler steam and mud drums 14 and 16, respectively. Burners 18 are typically fired by a carbonaceous fuel, and the resulting effluent gasses of combustion, following heat extraction for water and steam heating purposes, are exhausted from within power boiler 10 through chimney connections 20. As with all power boilers, it is necessary from time to time to remove and replace one or more of individual boiler tubes 12 from within power boiler 10, and such is basically accomplished by selected tubes first being cut at their ends adjacent the exterior wall metal of drums 14 and 16 for removal. The boiler tube flared-end segment peeler tool 100 of the present invention pertains generally to the removal of the remaining tube flared-end segments 13 that are initially retained in the steam and mud drum peripheral walls and, as illustrated in FIG. 2, such tool is basically utilized from a position within or interior of the applicable boiler drum largely as a matter of convenience.

Figure 3:
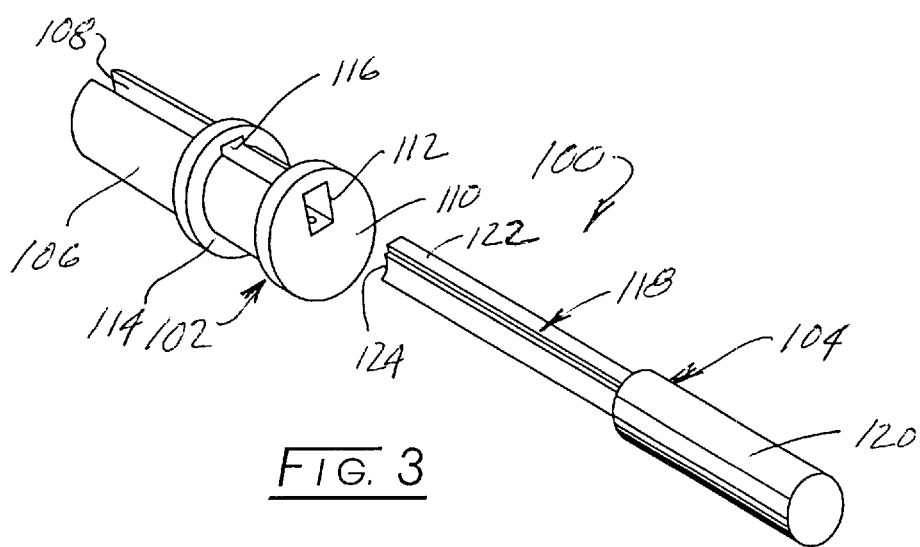
FIG. 3 is an exploded perspective view of a preferred embodiment of the boiler tube flared-end segment peeler tool of the present invention shown prior to insertion into a longitudinally-grooved boiler tube flared-end segment.

In FIG. 3 of the drawings I illustrate a preferred embodiment of the hand tool of the present invention. Such is designated 100, and is basically comprised of a guide element 102 and slidably co-operating peeler element 104. Guide element 102 is a unitary structure comprised of an elongated barrel section 106 having internal longitudinal slot 108, a joined guide end section 110 that includes tool entrance opening 112, and an intermediately-positioned guide integral stop ring 114. Integral stop ring 114 is provided with notch-like registration opening 116. Peeler element 104 is comprised of a peeler section 118 and an adjoining drive-head section 120.

It is important that guide element 102 have a barrel section diameter that is very nearly equal to but less than the internal diameter of boiler tube flared-end segment into which it will be inserted in order to properly support tool 100 during its use. Also, it is important that guide slot 108 and guide element end entrance opening 112 each have a height and a width that will accommodate sliding insertion of the peeler element 104 into guide element 102. Elongated peeler section 118 of peeler element 104 is preferably constituted of a hardened stool steel material and has a peeler spine 122 that has a width which is very nearly equal to the width of the gap metal that is to be removed from boiler tube end segment 13 (see FIGS. 4 and 5) by shearing and peeling. Most important, the upper edges of guide element registration opening 116 and guide element tool entrance opening 112 must each be radially positioned with respect to the longitudinal axis of guide barrel section 106 so as to preclude any portion of peeler spine 122 from contacting surrounding boiler header or boiler drum wall metal during the advancement of peeler element 104 throughout the length of the retained boiler tube flared-end segment 13 tool to effect gap metal removal. The free end of peeler section 118 has a curved shear and bend face 124 (see FIGS. 4 and 5) that functions to "peel" the gap metal strip 126 from retention in boiler tube flared-end segment 13.

Referring to FIGS. 4 and 5, when utilizing tool 100 in connection with the removal and replacement of a boiler tube the first step is to properly insert tool guide element 102 into the previously longitudinally-grooved boiler tube end segment 13 until stop 114 contacts the tube segment end and with guide registration opening 116 aligned between the tube flared-end segment previously-machined longitudinal grooves. Section 118 of tool peeler element 104 is next inserted successively through openings 112 and 116 and its end face 124 brought into initial contact with boiler tube gap metal 126. Repeated manual forcing of the free end of drive-head section 120 of tool peeler element 104, as with a conventional hammer tool, until that drive head section contacts guide element 102 will advance that element toward the opposite end of tube segment 13 thus completely shearing and removing the undesired gap metal from throughout the length of boiler tube segment 13. See FIG. 5. Subsequently the retained but completely gapped boiler tube end segment may be diametrically or circumferentially compressed to totally free the boiler tube end segment from retention within the boiler drum wall.

A spring-loaded detent feature 130 is included in guide element 102 to obtain assurance that the upper surface of peeler element spine 122 remains in contact with the upper surfaces of registration and entrance openings 112 and 116 thereby assuring proper tool orientation at all times during tool utilization.

I claim, as my invention:

1. A peeler tool useful in connection with the removal of a co-operating, longitudinally grooved, boiler tube flared-end segment from retention within a power boiler drum wall, and comprising:

a tool guide element adapted to be inserted into said boiler tube end segment having a barrel section with an open slot, an end section with an entrance through opening which opens into said slot and an intermediate stop; and a separate tool peeler element having an elongated peeler section with a drive-head section joined to said peeler section, said tool guide element end section entrance opening having a width and a height slightly more than the width and height of said tool peeler element peeler section, said tool peeler element peeler section having a curved shear and bend end face, and said tool peeler element peeler section received within said tool guide element entrance through opening and said open slot and movable longitudinally with respect to said tool guide element.

2. The peeler tool invention defined by claim 1, and wherein said tool peeler element peeler section has a superimposed peeler spine, and wherein the width of said tool peeler element peeler section superimposed peeler spine is only slightly less than the width of said tool guide element end section entrance opening.

3. The peeler tool invention defined by claim 1, further comprising a spring loaded detent mounted within said tool guide element end section which engages said tool peeler element peeler section and biases said tool peeler element peeler section against the surfaces defining said tool guide element through opening.

* * * * *